(12) United States Patent
Miller et al.

(10) Patent No.: US 11,250,256 B2
(45) Date of Patent: Feb. 15, 2022

(54) BINARY LINEAR CLASSIFICATION

(71) Applicant: Intel Corporation, Santa Clara, CA (US)

(72) Inventors: John David Miller, Portland, OR (US); James Asoka Diggs, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 918 days.

(21) Appl. No.: 16/062,054

(22) PCT Filed: Dec. 26, 2015

(86) PCT No.: PCT/US2015/000393
§ 371 (c)(1),
(2) Date: Jun. 13, 2018

(87) PCT Pub. No.: WO2017/111835
PCT Pub. Date: Jun. 29, 2017

(65) Prior Publication Data
US 2021/0224534 A1 Jul. 22, 2021

(51) Int. Cl.
*G06K 9/00* (2006.01)
*G06K 9/62* (2006.01)
(Continued)

(52) U.S. Cl.
CPC ....... *G06K 9/00469* (2013.01); *G06K 9/6267* (2013.01); *G06N 7/005* (2013.01); *G06N 20/00* (2019.01)

(58) Field of Classification Search
USPC .................................. 382/112–165, 181–229
See application file for complete search history.

(56) References Cited

U.S. PATENT DOCUMENTS 6,678,548 B1 * 1/2004 Echauz ................ A61B 5/7267
600/544
8,111,923 B2 * 2/2012 Csurka ................ G06K 9/4676
382/190
(Continued)

OTHER PUBLICATIONS

International Preliminary Report on Patentability in International Application No. PCT/US2015/000393, dated Jun. 26, 2018, 8 pages.
(Continued)

*Primary Examiner* — Marcellus J Augustin
(74) *Attorney, Agent, or Firm* — Alliance IP, LLC

(57) ABSTRACT

In an example, there is disclosed a computing apparatus for performing binary classification on a corpus of objects, having: one or more logic elements providing a classification engine to: access a training set comprising a plurality of binary classified objects, each object including one or more features, and each object designated as belonging to the class or not belonging to the class; build a model comprising a probability that each of the one or more features implies that an inspected object belongs to the class; access a particular object from the corpus; analyze the particular object to identify one or more identified features, the identified features selected form the one or more features; assign the particular object a composite score comprising a sum of the identified features; and designate the particular object as belonging to the class if and only if the composite score is above a threshold.

24 Claims, 7 Drawing Sheets

(51) Int. Cl.
*G06N 7/00* (2006.01)
*G06N 20/00* (2019.01)

(56) References Cited

U.S. PATENT DOCUMENTS

| | | | |
|---|---|---|---|
| 9,043,894 B1* | 5/2015 | Dennison | H04L 63/1408 |
| | | | 726/11 |
| 10,209,974 B1* | 2/2019 | Patton | G06N 20/00 |
| 2008/0101689 A1 | 5/2008 | Forman | |
| 2011/0293173 A1 | 12/2011 | Porikli et al. | |
| 2015/0054824 A1 | 2/2015 | Jiang | |
| 2015/0110387 A1 | 4/2015 | Lienhart et al. | |
| 2015/0370887 A1 | 12/2015 | Khapra et al. | |
| 2015/0379429 A1* | 12/2015 | Lee | G06N 20/00 |
| | | | 706/11 |

OTHER PUBLICATIONS

International Search Report and Written Opinion in International Application No. PCT/US2015/000393, dated Aug. 24, 2016, 10 pages.

\* cited by examiner

Fig. 5a

(12) United States Patent 504   (10) Patent No.: US 9,213,666 B2
Adler et al.   (45) Date of Patent: *Dec. 15, 2015

(54) PROVIDING A SIDEBAND MESSAGE INTERFACE FOR SYSTEM ON A CHIP (SOC)

USPC .............. 710/305–306, 240–244; 713/322
See application file for complete search history.

(71) Applicant: Intel Corporation, Santa Clara, CA (US)

(56) References Cited

U.S. PATENT DOCUMENTS

(72) Inventors: Robert P. Adler, Santa Clara, CA (US); Eran Tamari, Ramat Gan (IL); Mikal C. Hunsaker, El Dorado Hills, CA (US); Sridhar Lakshmanamurthy, Sunnyvale, CA (US); Michael T. Klinglesmith, Portland, OR (US); Blaise Fanning, Folsom, CA (US)

530

5,493,566 A 2/1996 Ljungberg et al.
6,009,488 A 12/1999 Kavipurapu
(Continued)

FOREIGN PATENT DOCUMENTS

540

EP 2216722 A2 8/2010
JP 2007-135035 5/2007
(Continued)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

OTHER PUBLICATIONS

Intel Corporation, "An Introduction to the Intel QuickPath Interconnect," Jan. 2009, pp. 1-22.

(Continued)

550

570

(21) Appl. No.: 14/497,567

(22) Filed: Sep. 26, 2014

*Primary Examiner* — Tim T Vo
*Assistant Examiner* — Kim T. Huynh
(74) *Attorney, Agent, or Firm* — Trop, Pruner & Hu, P.C.

580

(65) Prior Publication Data

US 2015/0019788 A1 Jan. 15, 2015

(57) ABSTRACT

Related U.S. Application Data

(63) Continuation of application No. 13/306,244, filed on Nov. 29, 2011, now Pat. No. 9,053,251.

(51) Int. Cl.
  G06F 13/14 (2006.01)
  G06F 13/42 (2006.01)
  (Continued)

(52) U.S. Cl.
  CPC .......... G06F 13/4221 (2013.01); G06F 13/366 (2013.01); G06F 13/4036 (2013.01)

(58) Field of Classification Search
  CPC G06F 13/4221; G06F 13/366; G06F 13/4036

According to one embodiment, a system on a chip includes multiple agents each corresponding to an intellectual property (IP) logic and a fabric to couple the agents. The fabric can include a primary message interface and a sideband message interface. The fabric further includes one or more routers to provide out-of-band communications between the agents via this sideband message interface. To effect such communication, the router can perform a subset of ordering rules of a personal computer (PC)-based specification for sideband messages. Other embodiments are described and claimed.

24 Claims, 10 Drawing Sheets

PROVIDING A SIDEBAND MESSAGE INTERFACE 514 SYSTEM ON A CHIP (SOC)

This application is a continuation of U.S. patent application Ser. No. 13/306,24█, filed Nov. 29, 2011, the content of which is hereby incorporated by reference.

BACKGROUND

Mainstream processor chips, both in high performance and low power segments, are increasingly integrating additional functionality such as graphics, display engines, security engines, PCIe™ ports (i.e., ports in accordance with the Peripheral Component Interconnect Express (PCI Express™ (PCIe™)) Specification Base Specification version 2.0 (published 2007) (hereafter the PCIe™ specification) and other PCIe™ based peripheral devices, while maintaining legacy support for devices compliant with a PCI specification such as the Peripheral Component Interconnect (PCI) Local Bus Specification, version 3.0 (published 2002) (hereafter the PCI specification).

Such designs are highly segmented due to varying requirements from the server, desktop, mobile, embedded, ultramobile and mobile Internet device segments. Different markets seek to use single chip system-on-chip (SoC) solutions that combine at least some of processor cores, memory controllers, input/output controllers and other segment specific acceleration elements onto a single chip. However, designs that accumulate these features are slow to emerge due to the difficulty of integrating different intellectual property (IP) blocks on a single die. This is especially so, as IP blocks can have various requirements and design uniqueness, and can require many specialized wires, communication protocols and so forth to enable their incorporation into an SoC. As a result, each SoC or other advanced semiconductor device that is developed requires a great amount of design complexity and customization to incorporate different IP blocks into a single device. This 534 is a given IP block typically needs to be re-designed t 534 mmodate interface and signaling requirements of a given SoC, particularly with regard to out-of-band communication such as interrupts, power management information and so forth.

BRIEF DESCRIPTION OF THE DRAWINGS

FIG. 9 524 are detailed block diagram of a portion of a SoC in ac█████e with an embodiment of the present invention.

FIG. 10 is a b█ck diagram of another SoC in accordance with an embodiment of the present invention.

DETAILED DESCRIPTION

Figure 1:
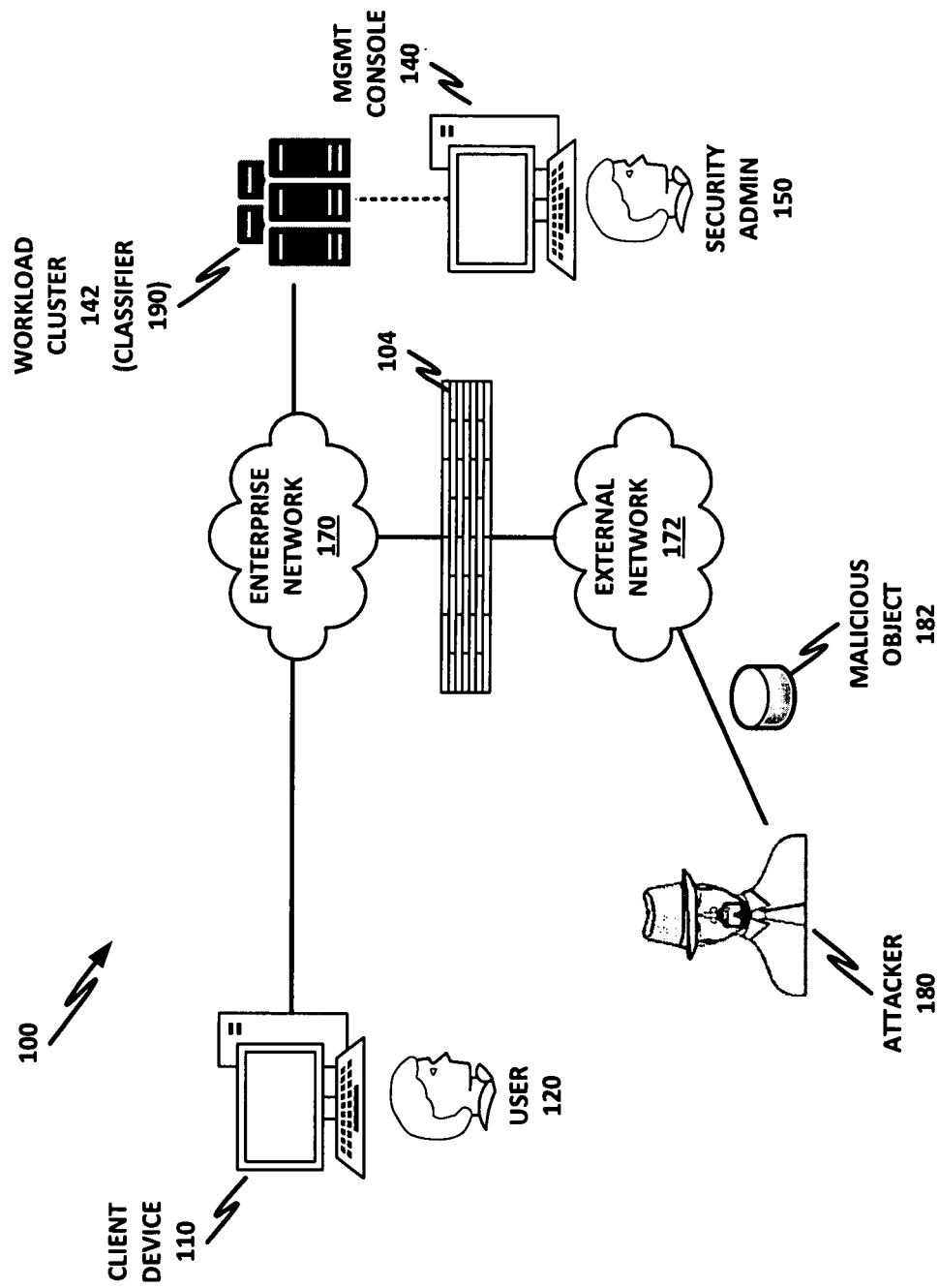
FIG. 1 is a block diagram of a basic interconnect architecture in accordance with an embodiment of the present invention.

To enable ease of integration of agents within a system on-chip (SoC), in various embodiments a standardized sideband message interface can be provided. This sideband message interface can be instantiated within each agent and a fabric that couples together the agents. To this end, the fabric can include router circuitry coupled to the various agents to provide for communication of messages on this sideband link, which may be a secondary message channel to a primary message interface over which high priority communications can occur. By provision of a sideband message interface having a relatively small number of wires, integration of agents into an SoC can occur more easily. At the same time, flexibility can be provided to enable customization of communications along the sideband interface for a particular design.

Embodiments can be used in many different types of systems. As examples, implementations described herein may be used in connection with semiconductor devices such as processors or other semiconductor devices that can be fabricated on a single semiconductor die. In particular implementations, the device may be a SoC or other advanced processor or chipset that includes various homogeneous and/or heterogeneous processing agents, and additional components such as networking components, e.g., routers, controllers, bridge devices, devices, memories and so forth.

Some implementations may be used in a semiconductor device that is designed according to a given specification such as an integrated on-chip system fabric (IOSF) specification issued by a semiconductor manufacturer to provide a standardized on-die interconnect protocol for attaching intellectual property (IP) blocks within a chip, including a SoC. Such IP blocks can be of varying types, including general-purpose processors such as in-order or out-of-order cores, fixed function units, graphics processors, IO controllers, display controllers, media processors among many others. By standardizing an interconnect protocol, a framework is thus realized for a broad use of IP agents in different types of chips. Accordingly, not only can the semiconductor manufacturer efficiently design different types of chips across a wide variety of customer segments, it can also, via the specification, enable third parties to design logic such as IP agents to be incorporated in such chips. And furthermore, by providing

BINARY LINEAR CLASSIFICATION

CROSS-REFERENCE TO RELATED APPLICATIONS

This application is a national stage application under 35 U.S.C. § 371 of PCT International Application Serial No. PCT/US2015/000393, filed on Dec. 26, 2015, and entitled BINARY LINEAR CLASSIFICATION. The disclosure of the prior application is considered part of and is hereby incorporated by reference in its entirety in the disclosure of this application.

FIELD OF THE SPECIFICATION

This disclosure relates in general to the field of machine learning, and more particularly, though not exclusively to, a system and method for binary linear classification.

BACKGROUND

Machine-driven classification of static objects, such as web pages, text documents, or multimedia content, is useful in contexts such as security and productivity.

Classifiers are a category of tool in the text analytics arsenal that help divide input data into one or more buckets. For example, email spam filter classifiers decide what incoming email is classified as "spam" and what is classified as "ham." Classifier algorithms are an area of active research in text analytics and analytics in general, with new algorithms attempting to produce better results, with less computation and/or with less training.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIG. 1 is a block diagram of a security-enabled network according to one or more examples of the present specification.

Figure 2:
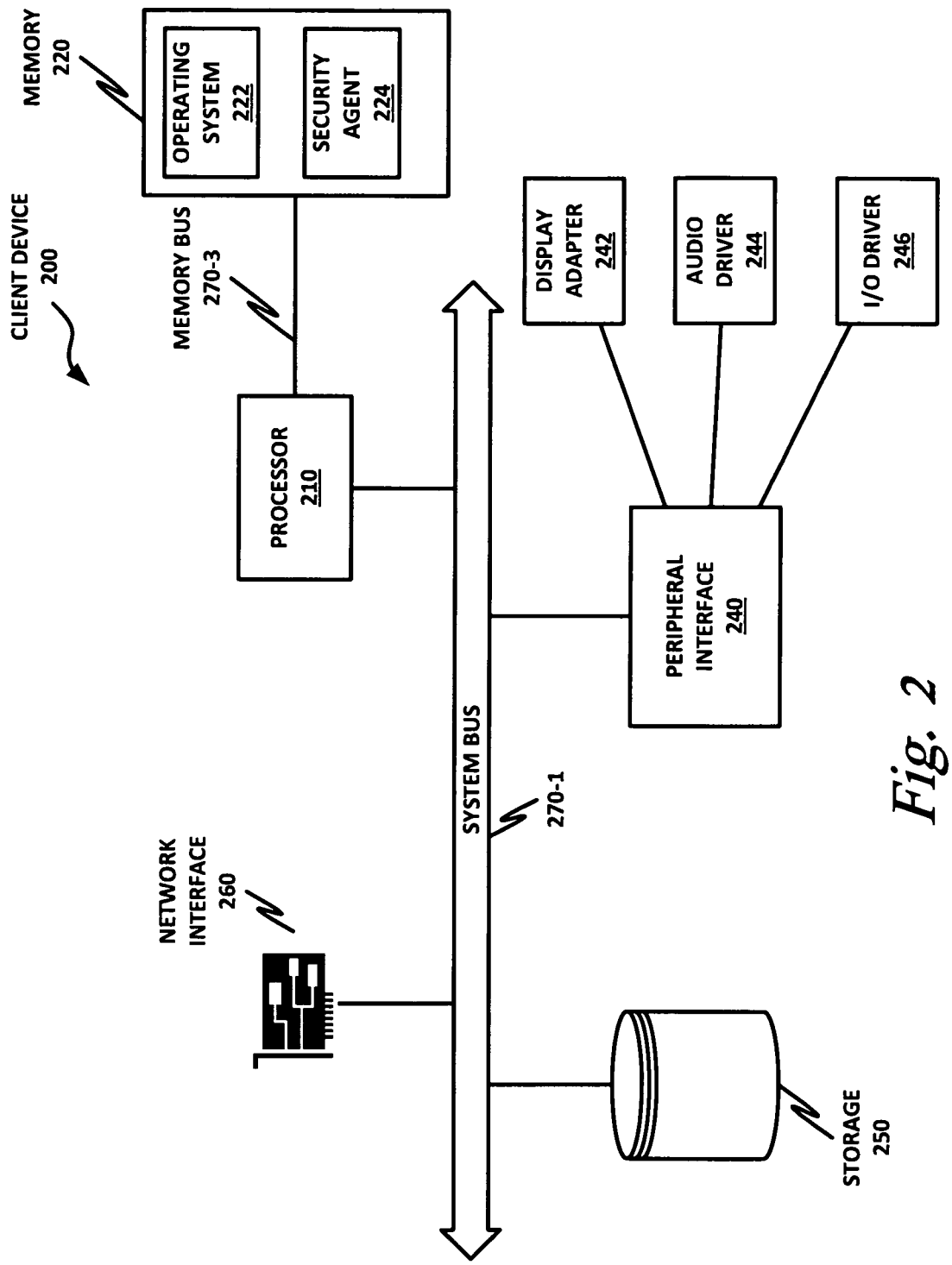

FIG. 2 is a block diagram of a computing device according to one or more examples of the present specification.

Figure 3:
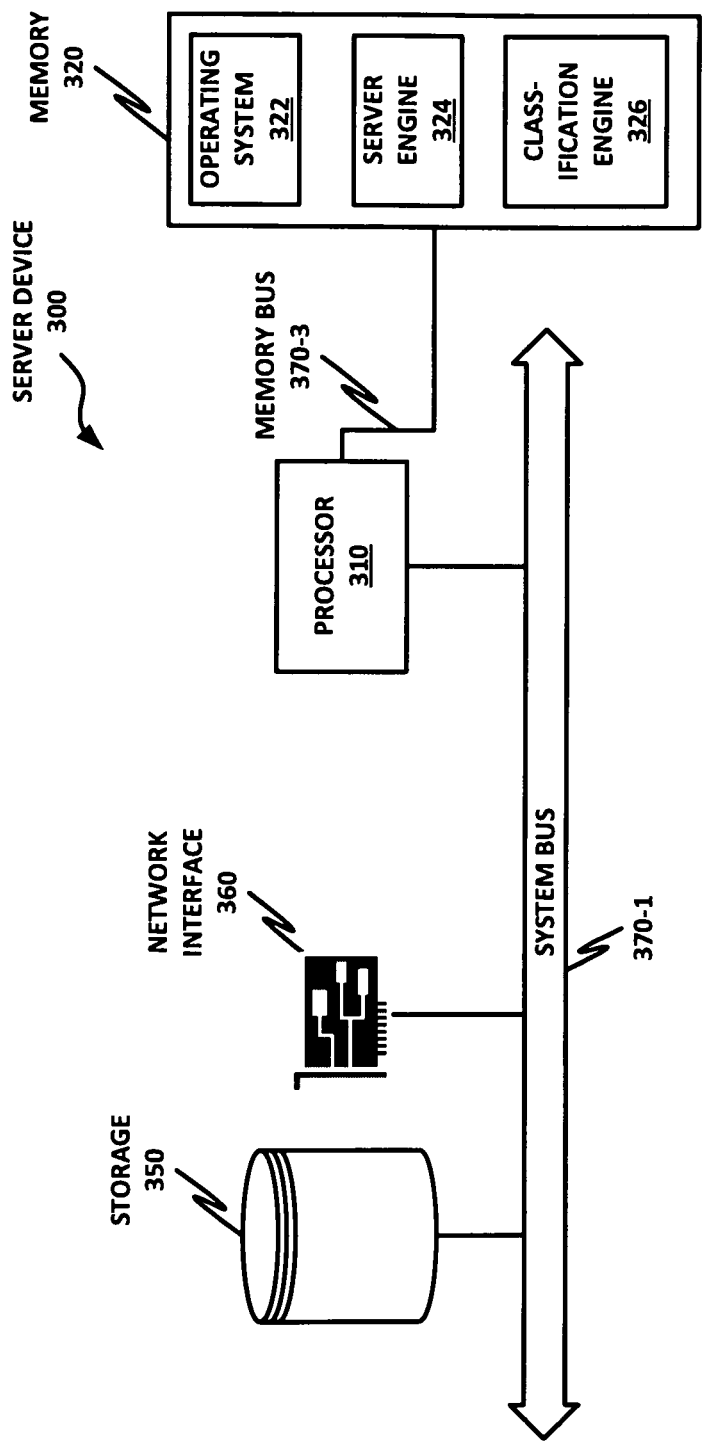

FIG. 3 is a block diagram of a server according to one or more examples of the present specification.

Figure 4:
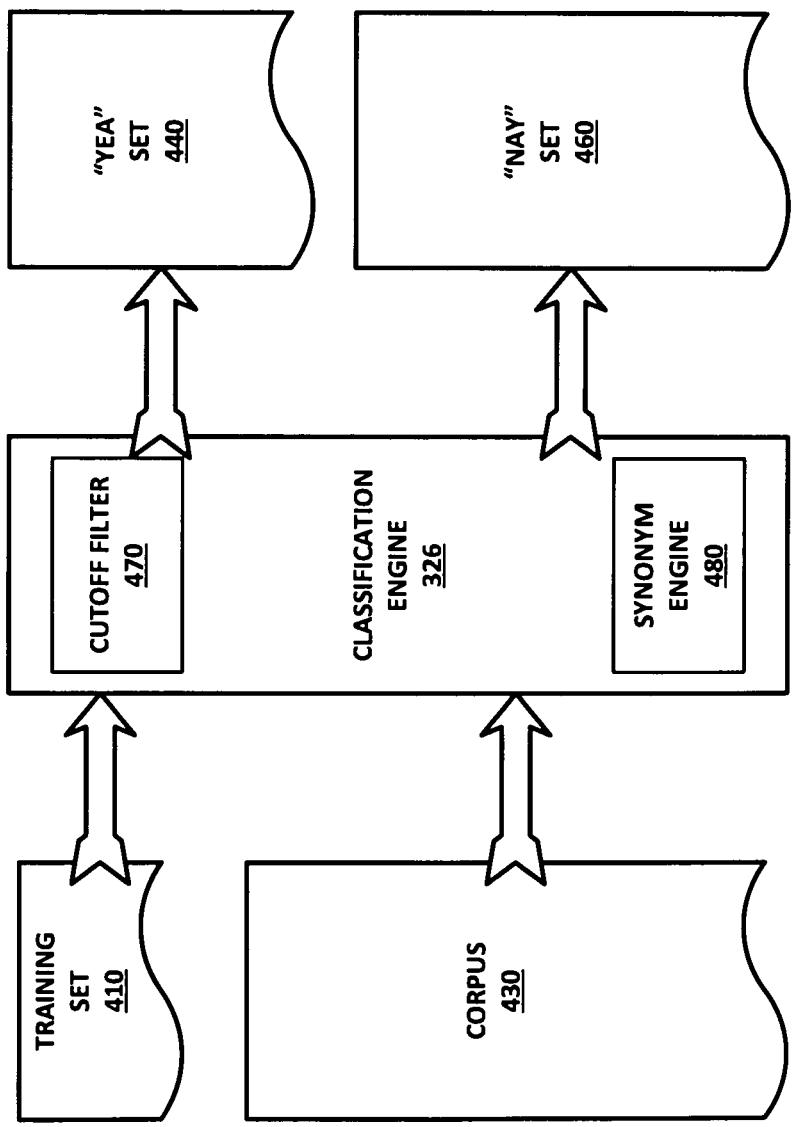

FIG. 4 is a block diagram of a classification according to one or more examples of the present specification.

FIGS. 5a and 5b are an illustration of analysis of an issued patent according to one or more examples of the present specification.

Figure 6:
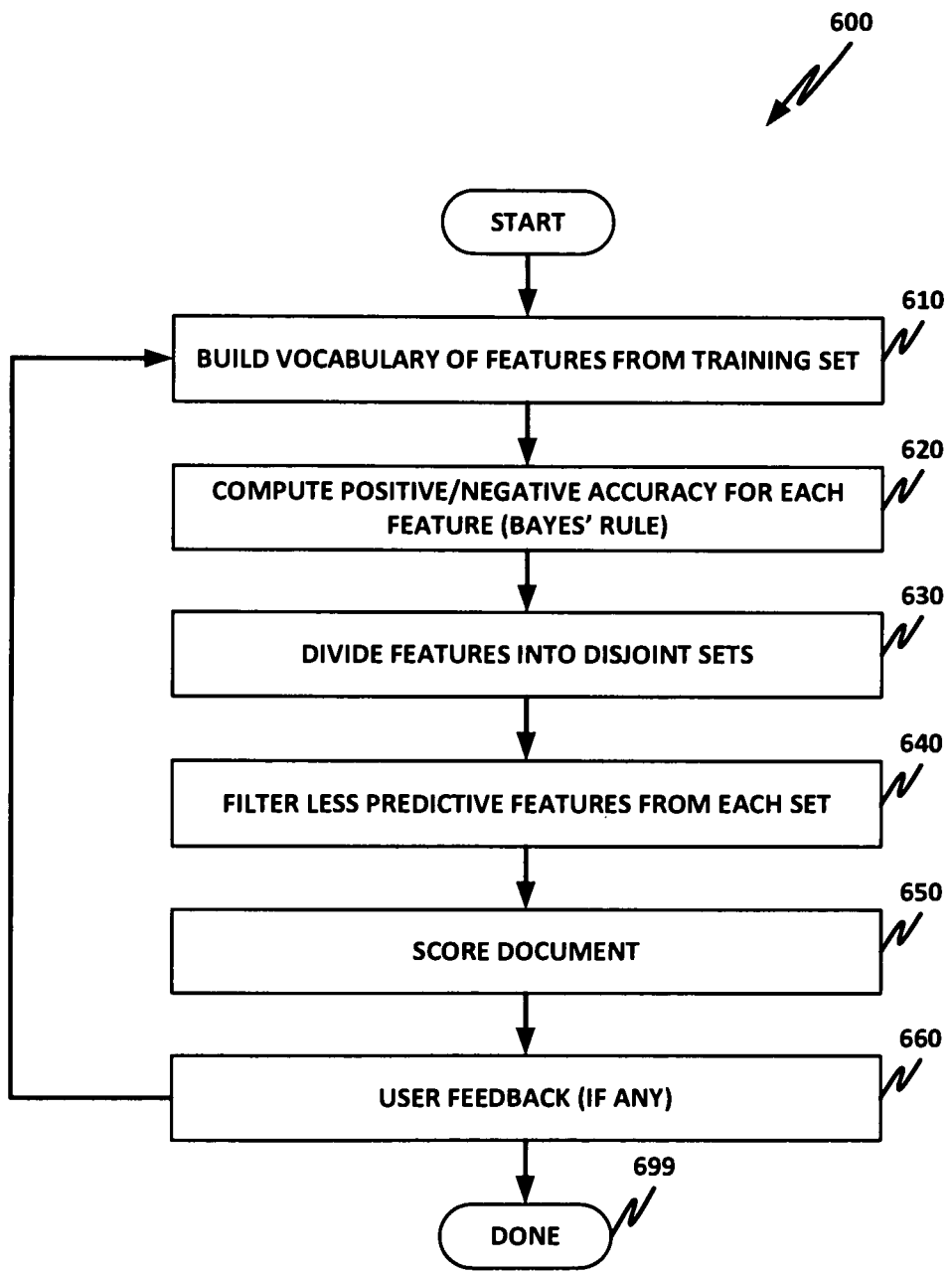

FIG. 6 is a flow chart of a method according to one or more examples of the present specification.

SUMMARY

In an example, there is disclosed a computing apparatus for performing binary classification on a corpus of objects, having: one or more logic elements providing a classification engine to: access a training set comprising a plurality of binary classified objects, each object including one or more features, and each object designated as belonging to the class or not belonging to the class; build a model comprising a probability that each of the one or more features implies that an inspected object belongs to the class; access a particular object from the corpus; analyze the particular object to identify one or more identified features, the identified features selected form the one or more features; assign the particular object a composite score comprising a sum of the identified features; and designate the particular object as belonging to the class if and only if the composite score is above a threshold.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments many have different advantages, and no particular advantage is necessarily required of any embodiment.

Classification of documents and other static objects is an important task for an enterprise. Such classification can have uses for security, privacy, litigation, and many other purposes.

In one nonlimiting example, an enterprise may have firewall rules configured to treat certain classes of websites differently. Business-essential websites (such as corporate websites, business information, partner sites, and similar) may be always allowed. Non-essential but harmless websites (such as news, general information, and e-commerce) may be allowed but logged. Time-wasting websites (such as sports, games, fashion, or other non-business-related subject matters) may be allowed only with explicit user input. Malicious websites (such as malware, or websites with illegal or unethical content) may be blocked and permissible only with special administrative dispensation.

Because there are many millions of websites, it may be impractical to have a human user manually classify each website. Rather, one or more machine classifiers may be employed to classify each website, and then permissions may be applied en grosse to each class. Thus, machine learning can be used to help deploy and enforce enterprise security and usage policies.

Similarly, a machine classifier may be used to assign ownership or other attributes to business documents. For example, an enterprise may deploy a database file system, in which files must be assigned attributes, such as which group owns each document, which client or job number a document belongs to, or similar attributes. The classifier may use existing metadata fields, file locations, and content to assign these attributes (each constituting a "class") to each document.

In some cases, classification is mutually exclusive. For example, when assigning ownership to a document, enterprise constraints may dictate that only one group can own the document. Thus, the classes are mutually exclusive (e.g., the owner can be either "Business" or "Marketing," but not both). In other cases, classes may be more analogous to "tags," and thus may be non-exclusive. For example, a popular sports website that also frequently features scantily-clad women and swimsuits, may be tagged as both "sports"

and "soft pornography." In the latter case, the site may inherit the permission set of its most-restricted tag.

In another example, machine classification may be used to mitigate the expense of electronic production for litigation. A binary classifier may scan a large corpus of documents, and tag each one as "relevant" or "not relevant" to the litigation. Additional classifiers may be used, for example, to tag documents as "privileged," "attorneys' eyes only," or as potential trial exhibits. Even if a human user is required to verify the classifications, having the initial tagging in place can significantly speed the process.

In this specification, binary classifiers may be used to divide static objects into "yea" and "nay" categories for a particular category. The terms "yea" and "nay," as used herein, are intended to be construed very broadly. Specifically, an embodiment need not use the terms "yea" or "nay" to be within the scope of this specification or the claims. Rather, "yea" represents any designator that denotes an object is within the class, and "nay" denotes an object that is not within the class.

Where a corpus is to be tagged with multiple tags, a plurality of binary classifiers may be used. For example, a large corpus of corporate documents may be scanned by four separate binary classifiers to determine whether they should be tagged as relevant to one or more of "Accounting," "Legal," "Engineering," or "Marketing."

Existing machine-learning classifier algorithms, such as naïve Bayes, support vector machines, and k-nearest neighbor, each have strengths and weaknesses. Different classifiers work better for different kinds of data and/or classification tasks. Most require iterative training and tweaking to "learn" parameters.

In particular, classifiers tend to be sensitive to the number of "features" being compared, and some types of classifiers, including "generative models," actually perform worse as more features are identified. This can be especially problematic with text classifiers, where each word in a document is potentially a feature. Finding the right features and/or the right number of features is time-consuming and is corpus-dependent.

The need for tuning can be a difficulty for streaming systems, where the flow of new documents invalidate the corpus statistics used to tune the classifier. Feature-dimension reduction techniques often use term frequency as a heuristic for finding the most important terms. But classifiers tuned in this way may be unable to readily take advantage of metadata features (i.e., features outside the body of the text itself), such as author, date, or organization, as the statistics (e.g., term frequency) do not apply to metadata.

According to an example, the method disclosed in this specification provides a discriminative binary text classification model that is scalable, computationally efficient, and self-tuning. Advantageously, this model improves its performance as features are added, and includes in its evidence not only word counts, but metadata. In an example, the binary linear classifier may also employ filtered logistic regression. This means that it produces a "yea"/"nay" answer when asked if a document belongs to a given class.

In an example, an array of classifiers, one per topic, is used to sort documents. Humans may train the classifiers using an interactive training application to select which topics a given document is about, also resulting in an implicit decision of which topics it is not about. After training, the classifiers calculate their internal model parameters, so that they can then predict a classification for other documents.

This method is an example of "supervised learning." Embodiments of supervised learning systems may share some common parameters, including:

Human-classified training data are provided to the classifier, either in bulk or via interactive training. For example, training may include exemplar documents, words or phrases, regular expressions, and metadata, including both "positive" and "negative" training, where positive defines what is in the class and negative defines what is not. For example, if searching for patent documents related to network security, terms such as "PKI," "RSA," and "attestation" may be positive correlations, while terms such as "dead bolt," "burglary," and "security camera" may be negative correlations (i.e., more likely related to premises security than network security).

The classifier learns the characteristics of the training set to build its internal model parameters of the class.

The classifier is then used to classify new data as in or out of the class.

Classifier models may be differentiated by how the classifier models the training input and how it uses that model to classify new items.

For example, "naïve Bayes" (NB) is a known existing generative classifier model. A generative model uses "hidden parameters" as inputs to generate observable data values, such as a classification. A generative model may specify a joint probability distribution over observation and label sequences. Naïve Bayes is a generative model that bases its decision on the probability that the document in question could have been generated by the class. Specifically, it constructs a class vocabulary out of all the terms in all the training documents and computes the probability of each term in this vocabulary as the frequency of occurrence in positively-trained documents. Then, the probability of a document being in this class is simply the product of the probability of the document terms over all terms in the vocabulary. In other words, NB and other generative models use the training data to estimate the distribution of terms in the class, and then judge documents according to how well they fit that distribution.

By contrast, the model disclosed in this specification may be designed as a discriminative (also called "conditional") model. Discriminative models model the dependence of an unobserved variable y on an observed variable x. Formally, this may comprise modeling the conditional probability distribution $P(x|y)$, so that y can be predicted from x.

In the example method, rather than modeling a probability distribution over the entire vocabulary, a classification engine determines which features are the most important, both positive and negative, and uses those when judging documents. During training, the classification engine develops a set of features that are positive evidence for including in the class, and a separate set of features that are negative evidence for including in the class. When judging a document, the classification engine weighs the positive and negative evidence in that document to decide whether it is in the class or not. Advantageously, the classification engine evaluates the document only on features that occur in that document, whereas NB and other generative models may penalize documents for not having features that occur in the vocabulary.

Advantageously, the classification engine of the present specification has the following features:

It is self-tuning. As the number of training examples increases, the criteria used to determine which terms to allow as evidence "raises the bar" so that only the best, most predictive terms are used.

In some embodiments, it is computationally efficient, being both vectorized and parallelized. That is, it operates on entire sets of data at a time (rather than iterating one by one) and on multiple sets at a time, allowing for scaling with multiple processors or nodes in a cluster.

It can handle any suitable type of feature that can be described (for example, n-grams, metadata, or rules), rather than only the set of generative terms found in a generative-model classifier such as Naïve Bayes.

Is not dependent on term-frequency statistics, which in some cases are a poor substitute for term importance. Moreover, by not relying on term frequencies, it can much more easily accommodate metadata, which may lack intra-document frequency.

Its accuracy improves, rather than diminishes, with more features.

A system and method for binary linear classification will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of an enterprise 100 receiving classification services according to one or more examples of the present specification. This figure illustrates one nonlimiting example of using binary classification to provide enterprise-class spam filtering on a network. This example is intended to be nonlimiting, and other examples are provided herein to illustrate the broad applicability of the methods disclosed herein.

In the example of FIG. 1, one or more users 120 operate one or more client devices 110. Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

A workload cluster 142 may be provided, for example as a virtual cluster running in a hypervisor on a plurality of rack-mounted blade servers, or as a cluster of physical servers. Workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs.

It should also be noted that some functionality of endpoint devices 110 may also be provided via workload cluster 142. For example, one microcloud may provide a remote desktop hypervisor such as a Citrix workspace, which allows users 120 operating endpoints 110 to remotely login to a remote enterprise desktop and access enterprise applications, workspaces, and data. In that case, endpoint 120 could be a "thin client" such as a Google Chromebook, running only a stripped-down operating system, and still provide user 120 useful access to enterprise resources.

In an example, one or more virtual machines are provisioned within workload cluster 142 to act as a machine classifier 190. Machine classifier 190 may be tasked with classification of network objects, including static and/or dynamic objects, for any suitable purpose, such as identifying spam and malware. For example, classification may be provided for enforcement of enterprise security and network usage policies, such as by classifying websites into various categories, each with different security settings or permissions. Similarly, machine classifier 190 may classify text documents for storage in a database file system. In another nonlimiting example, the machine classifier may be tasked with indexing content to ease searching and compilation, such as indexing patents by subject matter, as discussed below. In yet another example, network objects are classified for security purposes, and assigned to a classification such as "white" (permitted), "gray" (unknown), or "black" (barred) as part of an antivirus or antimalware scheme. In the latter case, the objects may be any network object as described herein, including static objects, active objects, and network-attached devices. These embodiments are provided as nonlimiting examples only, and should be understood to be non-exclusive. Many other uses for object classification are possible, and are within the intended scope of this specification.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In another case, management console 140 may be provided as a web interface, on a desktop-class machine, or via a VM provisioned within workload cluster 142. Security administrator 150 or user 120 may use either management console 140 or client device 110 to "train" a data set, either interactively, or by submitting a batch of pre-classified documents.

Enterprise 100 may encounter a variety of "security objects" on the network. A security object may be any object that operates on or interacts with enterprise network 170 and that has actual or potential security implications. In one example, security objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Enterprise 100 may communicate across enterprise boundary 104 with external network 172. Enterprise boundary 104 may represent a physical, logical, or other boundary. External network 172 may include, for example, websites, servers, network protocols, and other network-based services. In one example, an attacker 180 (or other similar malicious or negligent actor) also connects to external network 172.

It may be a goal of users 120 and enterprise 100 to successfully operate client devices 110 and workload cluster 142 without interference from attacker 180 or from unwanted security objects. In one example, attacker 180 is a malware or spam author whose goal or purpose is to cause malicious harm or mischief, for example by injecting malicious object 182 (e.g., spam or malware) into client device 110. Once malicious object 182 gains access to client device 110, it may try to perform work such as social engineering of user 120, a hardware-based attack on client device 110, modifying storage, modifying client application 112, or gaining access to enterprise servers 142.

The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this specification, malicious software ("malware") includes any security object configured to provide unwanted results or do unwanted work. In many cases, malware objects will be executable objects, including by way of non-limiting examples, viruses, trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

When a new object is first encountered on the network, security policies may initially treat it as "gray" or "suspect." As a first line of defense, machine classifier 190 may inspect the object and attempt to classify it. For example, if the object is an e-mail, machine classifier 190 may attempt to determine whether it is "ham" or "spam." If the object is executable, machine classifier 190 may attempt to determine whether it is "malware" or "not malware," or whether it is a "permissible application" or "impermissible application.")

FIG. 2 is a block diagram of client-class computing device 200 according to one or more examples of the present specification. Computing device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client device 110 may be an example of computing device 200. Users 120 may use computing device 200 to interact with a classified data set, or to perform tasks such as performing interactive training or submitting batches of pre-classified documents.

Computing device 200 includes a processor 210 connected to a memory 220, having stored therein executable instructions for providing an operating system 222 and at least software portions of a security engine 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processors may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of security agent 224. Many other configurations are also possible, and are intended to be encompassed within the broad scope of this specification.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Security engine 224, in one example, is operable to carry out computer-implemented methods as described in this specification. Security engine 224 may include one or more tangible non-transitory computer-readable mediums having stored thereon executable instructions operable to instruct a processor to provide a security engine 224. As used throughout this specification, an "engine" includes any combination of one or more logic elements, of similar or dissimilar species, operable for and configured to perform one or more methods provided by the engine. Thus, security engine 224 may comprise one or more logic elements configured to provide methods as disclosed in this specification. In some cases, security engine 224 may include a special integrated circuit designed to carry out a method or a part thereof, and may also include software instructions operable to instruct a processor to perform the method. In some cases, security engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that security engine 224 may also include other hardware and software, including configuration files, registry entries, and interactive or user-mode software by way of non-limiting example.

In one example, security engine 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of security engine 224 to provide the desired method.

In certain embodiments, security engine 224 may be provisioned on client device 200 to enforce enterprise security, resource usage, or other policies. For example, when a user 120 directs client device 200 to a particular website, security engine 224 may query a server engine for an appropriate class and associated permissions. The machine may then locally enforce those permissions on client device 200. Enforcement may also be performed in whole or in part by server devices 300 (FIG. 3). In another example, security engine 224 may mark e-mails as "spam" or "ham." In yet another example, security engine 224 may simply provide an interface for accessing documents or objects that have been classified by classification engine 326.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

In an example, any of the devices in workload cluster 142, including machine classifier 190, may be a server-class device 300. Server-class device 300 is disclosed as a separate device from client device 200 to illustrate one logical division of function between devices. But it should be understood that this example is not intended to be limiting, and that a classification engine 326 may be provided on a client device 200 in suitable circumstances.

Server 300 includes a processor 310 connected to a memory 320, having stored therein executable instructions for providing an operating system 322 and at least software portions of a server engine 324. Other components of server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server engine 324.

Network interface 360 may be provided to communicatively couple server 140 to a wired or wireless network, and may include one or more logic elements as described in FIG. 2.

Server engine 324 is an engine as described in FIG. 2 and, in one example, includes one or more logic elements operable to carry out computer-implemented methods as described in this specification. Software portions of server engine 324 may run as a daemon process.

Server engine 324 may include one or more non-transitory computer-readable mediums having stored thereon executable instructions operable to instruct a processor to provide appropriate services. At an appropriate time, such as upon booting server 140 or upon a command from operating system 322 or a user 120 or security administrator 150, processor 310 may retrieve a copy of server engine 324 (or software portions thereof) from storage 350 and load it into memory 320. Processor 310 may then iteratively execute the instructions of server engine 324 to provide the desired method.

Server engine 324 may provide services such as a web-server, database server, database file system server, network antivirus or antimalware engine, or other functions that may benefit from the classification methods disclosed herein.

Classification engine 326 is also an engine as described herein, and may include one or more logic elements operable to carry out computer-implemented methods as described in this specification. Software portions of classification engine 326 may run as a daemon process.

Classification engine 326 may include one or more non-transitory computer-readable mediums having stored thereon executable instructions operable to instruct a processor to provide classification services. At an appropriate time, such as upon booting server 140 or upon a command from operating system 322 or a user 120 or security administrator 150, processor 310 may retrieve a copy of classification engine 326 (or software portions thereof) from storage 350 and load it into memory 320. Processor 310 may then iteratively execute the instructions of classification engine 326 to provide the desired method.

More specific functions of classification engine 326 are provided throughout this specification.

FIG. 4 is a block diagram of classification of a corpus of documents according to one or more examples of the present specification.

In this example, a training set 410 is first defined. Training set 410 may commonly be much smaller than corpus 430, and may include documents selected from corpus 430. In one example, corpus 430 is the corpus of published and issued U.S. patents and patent applications. Because this corpus comprises many millions of documents, it may be impractical for a human user to manually classify all of them. However, it may be important for a user to identify the most relevant documents in a given context. For example, if enterprise 100 has been sued for patent infringement, enterprise 100 may want to determine whether the patent is valid. To do this, enterprise 100 may want to identify the most relevant patents in the same field of art, including those with disclosures most similar to the claims.

Thus, enterprise 100 may employ a search firm to perform a traditional key word search of the patent database to identify a set of patents and publications that are most similar to the patent at issue. This may commonly yield some tens of potentially relevant patents. One or more human reviewers, such as an associate attorney, may review these references to identify the ones that are most relevant to the patents at issue. The human reviewer may also identify key words that commonly appear in relevant patents. Using an interactive interface, or in a batch processing mode, the reviewing attorney may mark the most relevant references, optionally including identifying features that appear highly predictive of the important features. It should be noted that the training set can contain examples from many different human reviewers and data sources.

In addition to classified documents, the training set may include other information, such as positive exemplars ("ham"), negative exemplars ("spam"), and positive or negative features (similar to keywords).

Classification engine 326 then receives training set 410, along with the larger patent corpus 430. Employing method 600 of FIG. 6, or another suitable method, classification engine 326 searches each document in corpus 430, and marks it as either "yea" or "nay." Classification engine 326 can then divide corpus 430 into a yea set 440, and a nay set 460.

Optionally, the human reviewer can then review one or both sets and provide feedback. For example, the human reviewer could review all of the references in yea set 440, pick out the most relevant references and features, and add those to training set 410. Nay set 460 may be much larger than yea set 440, so it may not be practical for the human reviewer to review the whole set, but he may perform some key word searches to look for any potentially relevant references that were missed, and also use those to refine the search. The revised training set can then be used to again train classification engine 326, which can again search corpus 430, possibly providing more accurate results.

Optionally, classification engine 326 may include a synonym engine 480. Synonym engine 480 may be configured to identify words or phrases with identical or similar meanings, including variations on word forms (e.g., plurals and changes in tense), and true synonyms (e.g., "NIC" vs. "Ethernet card").

Classification engine 326 may also include a cutoff filter, whose function is described in more detail in connection with block 640 of FIG. 6.

FIGS. 5A and 5B are an illustration of feature sources that may be used in an embodiment where the text of issued and published patents comprise corpus 430. In this example, the text of detailed description 524 (FIG. 5B) provides textual features, similar to those used in existing classification methods. This can include dividing description 524 into words or phrases, and counting the number of times each word or phrase appears. For example, "system-on-a-chip" may be treated as a phrase, while "semiconductor" may be considered as a single word.

Certain embodiments may also employ the concept of word variations and synonyms. For example, "SoC" is a common abbreviation for "system-on-a-chip," and they may be treated as an identical word. Similarly, "system on a chip," "systems on a chip," and "systems-on-a-chip" may all be considered identical for purpose of classification engine 326.

However, non-identical words with similar meaning may also be useful. This may include a recognition that words can be both contemporaneously synonymous, and that words can change over time. Indeed, as technologies mature, they may organically acquire new and different nomenclatures. To provide just one example, the first known patents on transistors did not refer to the devices as "transistors." Rather, they referred to them as "amplifiers" or similar. Thus, patent date 510 (FIG. 5A) may be a relevant factor to consider in conjunction with vocabulary. For a 2015 date, "transistor" may be a more predictive term, while for a 1925 date, "amplifier" may be a more predictive term. Thus, classification engine 326 may include a synonym engine 480 (FIG. 4) to identify synonyms, including temporal spacing of synonyms.

With reference to FIG. 5A, additional fields may be used as features. For example, title 504 may provide useful key words. Similarly, abstract 590 may be assumed to be somewhat more narrowly focused than detailed description 524. Filing date 550 may be used instead of or in conjunction with issue date 510, for example in tracking how synonyms change over time, or in tracking how the technology progresses over time.

Assignee 540 may provide a useful feature, as a single assignee may have generally similar subject matter. For example, with assignee "Intel Corporation," mentions of "security" may be more likely to be associated with digital security than physical security.

Inventors 530 may also be predictive, as a single inventor may have certain fields of art where he or she generally operates. Thus, an author who exclusively or almost exclusively operates in a particular technology area may be strongly predictive of patents in that field. Similarly, the inventor's location may also be mildly predictive, as certain technologies often find a geographic *nexus* in a concentrated area.

Classifications 560 may also be predictive of the subject matter. These fields are, in fact, a starting place for many patent searches, as they represent a "first pass" at categorizing the patent.

References cited 520 may point to prior patents in a similar field or subject matter area. Thus, if the cited references have previously been classified as belonging to a subject matter, that may be strongly predictive that the current document is also related to that subject matter.

Examiners 570 may also be predictive of the subject matter, as examiners often specialize in particular areas of art. Thus, an examiner who has previously examined a patent in a subject matter area may be predictive of the same subject matter. Similarly, the prosecuting attorney, agent, or firm 580 may have a predictive area of specialization.

Turning to FIG. 5B, in addition to the detailed description 524, the background 514 and description of the drawings 534 may also be predictive. The background section 514 may be relevant at least in part because it may discuss certain aspects of the prior art, and may thus rely on nomenclature that is common in the art. The description of the drawings 534 may also introduce useful nomenclature, as drawings may be labeled with names of the novel technology.

It should be noted that not every word used in a patent or other document necessarily represents a useful feature. Some words will be so well-used throughout a corpus that they have no practical predictive value, either positive or negative. For example, some articles, conjunctions, and prepositions may be so common as to be essentially without predictive value. And in the case of a patent corpus, terms such as "invention," "embodiment," "example," "comprising," and "specification," though uncommon enough to casual language that they may be useful in classifying a document as a patent, are within the corpus of patents are so universally used that they are not very useful in predicting the subject matter. Thus, in analysis of any of the foregoing fields, as part of training classification engine 326, a dictionary of "ignored" terms may be provided.

FIG. 6 is a flow chart of a method, for example performed by classification engine 326 according to one or more examples of the present specification.

In block 610, classification engine 326 builds, from the set of trained documents in training set 410, a vocabulary of features for the class. For each feature, classification engine 326 counts the number of times the feature occurs with positively-trained documents and the number of times the feature occurs with negatively-trained documents. Thus, for each feature, classification engine 326 computes the probability, positive and negative, that documents with that feature will be judged positive or negative. For example, in the case of a spam filter, almost all documents (e.g., 9 out of 10) from the user's supervisor may be considered "ham," whereas most documents (e.g., 4 out of 5) with the word "enhancement" may be considered "spam."

Other methods may be used, such as lemmatizing, often by stemming (e.g., lexically clipping a terminal 's' from a word), or by dictionary lookup (e.g., mapping "men" to "man"). Parts of speech may also be extracted, and noun phrases, adjectives, and others may be identified. Relationships may also be extracted between other features. For example, co-occurrence (words occur in the same document), or proximity (words occur within N words of each other).

In block 620, for each feature, classification engine 326 uses Bayes Rule to compute a positive and a negative "accuracy" score, as a measure of the feature's positive/negative predictive power. Bayes Rule, as it applies to this embodiment, is discussed in additional detail below. To compute accuracy, classification engine 326 uses the feature's positive or negative odds (described above), the frequency of positive/negative examples in the training set, and the frequency of this feature in the training data.

In block 630, features are logically divided into disjoint sets, where features with higher positive accuracy are considered to be "positive" features, and features with higher negative accuracy are considered to be "negative" features.

In block 640, looking at both sets (positive and negative features) separately, cutoff filter 470 (FIG. 4) of classification engine 326 filters out the features below a "noise threshold." These are features that are deemed less accurate, relative to the others in that set. The noise threshold (i.e., filter cutoff) may be tunable for desired precision and recall performance, but generally classification engine 326 may use the mean of the feature set accuracy, minus its standard deviation. Features with accuracy lower than the noise threshold are disabled, and thus excluded from judging. This effectively removes "noise" features that have little predictive power, even if they are not in the "ignored" dictionary.

In block 650, classification engine 326 judges/classifies the document or other object. To judge (classify) a document, classification engine 326 sums the evidence for and against inclusion in the class: the sum of positive features in the document minus the number of negative features in the document, denoted S. $S > 0$ implies that the document is in the class (category). $S \leq 0$ implies that it is not.

In one embodiment, each feature's "vote" is weighted the same. In another embodiment, each feature votes its accuracy, thus preserving the meritocracy of higher-accuracy features. Additional details on computing feature accuracy are disclosed below.

In another embodiment, rather than returning a simple sum and difference of positive and negative features, classification engine 326 may return the ratio of these two models, i.e. Bayes Factor, thus preserving the scale (i.e., $S > 0$ is in the class, $S \leq 0$ is not in the class). This may be computed according to:

$$S = \ln \frac{1 + pos}{1 + neg}$$

If interactive supervised learning is enabled, then in block 660, the user may have an opportunity to provide feedback. For example, the user could review several randomly selected document classifications, and via an interactive user interface could approve or disapprove each decision. This may include a Boolean decision (+/−), or it could be more graded (e.g., +++/++/+/0/−/−/−). The user may also have an opportunity to identify features or factors that influence the decision. For example, if the machine classifier has classified a document as being relevant to cyber security, the presence of the term "padlock" may be a strong negative feature that should be accounted for in future passes.

In block 699, the method is done.

Advantageously, by basing the noise threshold on the performance of the entire set of features, the classifier is self-tuning, based on the quality of evidence in the training set.

Also advantageously, by modeling positive and negative feature sets separately, classification engine 326 can more accurately fit the distributions for the noise threshold, and thus be less sensitive to imbalances in positive and negative training examples.

Also advantageously, by filtering noise features, classification engine 326 are less sensitive to terms that would otherwise be "stopped" at the feature-extraction stage. Filtering them during feature extraction merely improves efficiency (since those features are thus ignored entirely) rather than accuracy.

Additional details on computing feature accuracy are provided here by way of example.

Bayes Rule states that the "posterior" probability of a hypothesis equals the "prior" probability of the hypothesis times the "likelihood" of the hypothesis, divided by the probability of seeing the data by chance. In this case, the "hypothesis" is that the present feature is evidence for the present document being in this class (for positive features), or excluding it from this class (for negative features). Thus, Bayes Rule in this context can be written:

$$p(h|d) = \frac{p(h) * p(d|h)}{p(d)}$$

Where:

p(h|d): Probability of the hypothesis, given the data. The "accuracy" score for this feature.

p(h): Probability of the hypothesis. The probability described in block 610 of FIG. 6 (the "prior" probability).

p(d|h): Probability of data given hypothesis. Out of trained examples for this hypothesis, how many contain this feature (i.e., the "likelihood")?

p(d): Probability of data. The number of times this feature occurs in the training set. Since it is given that there are only two hypotheses, (i.e., in the class, or not in the class) and that these hypotheses are mutually exclusive and collectively exhaustive, p(d) can be computed via the law of total probability, thus:

$$p(d)=p(h1)*p(d|h1)+p(h2)*p(d|h2)$$

This method achieves advantages over certain embodiments of existing classifier methods, such as Naïve Bayes. For example, in NB and similar methods, a document's score is the product of the feature probabilities. In contrast, here the features "for" and "against" are simply summed, since only the most accurate features remain after filtering.

It should also be noted that while an end-to-end method is disclosed here, certain portions of it may be applied piecewise. For example, the classification engine of the present specification could be used to identify a useful feature set. A different algorithm, such as naïve Bayes, could then use that feature set as an input and run according to its normal procedure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise reflected in the appended claims.

EXAMPLE IMPLEMENTATIONS

There is disclosed in one example, a computing apparatus for performing binary classification on a corpus of objects, each object to be designated as either belonging to a class or not belonging to the class, comprising: one or more logic elements, including at least one hardware logic element, comprising a classification engine to: access a training set comprising a plurality of binary classified objects, each object including one or more features, and each object designated as belonging to the class or not belonging to the class; build a model comprising a probability that each of the one or more features implies that an inspected object belongs to the class; access a particular object from the corpus; analyze the particular object to identify one or more identified features, the identified features selected form the one or more features; assign the particular object a composite score comprising a sum of the identified features; and designate the particular object as belonging to the class if and only if the composite score is above a threshold.

There is further disclosed an example, wherein building a model further comprises an accuracy to at least some of the one or more features, the accuracy comprising a probability that the feature implies one of that an object belongs to the class or does not belong to the class.

There is further disclosed an example, wherein assigning an accuracy comprises a computation of the form $$p(h|d) = \frac{p(h) * p(d|h)}{p(d)},$$

wherein p(h|d) is the accuracy, p(h) is a hypothesis comprising a probability that an object with the feature either belongs to the class or does not belong to the class, p(d) is a number of times the feature appears in the training set, and p(d|h) is the number of objects of the hypothesis in the training set containing the feature.

There is further disclosed an example, wherein the classification engine further comprises a cutoff filter to filter features whose accuracy is below a noise threshold.

There is further disclosed an example, wherein filter is a mean of accuracies of the training set minus a standard deviation.

There is further disclosed an example, wherein assigning the object a composite score comprises weighting each feature equally.

There is further disclosed an example, wherein assigning the object a composite score comprises weighting each feature proportional to its accuracy.

There is further disclosed an example, wherein each of the identified features has a value greater than zero if it implies that an object belongs to the class, or a value less than zero if it implies that an object does not belong to the class.

There is further disclosed an example, wherein the composite score is normalized to zero.

There is further disclosed an example, wherein computing the composite score comprises a function of the form $$S = \ln\frac{1+pos}{1+neg},$$

wherein S is the composite score, pos is a sum of features implying that an object belongs to the class, and neg is a sum of features implying that an object does not belong to the class.

There is further disclosed an example, wherein the classification engine further comprises a synonym detector to identify and group features with similar or identical meaning.

There is further disclosed an example, wherein the features comprise metadata features other than word counts.

There is further disclosed an example, wherein the classification engine is to provide interactive supervised learning.

There is further disclosed an example of or more tangible, non-transitory computer-readable mediums having store thereon executable instructions for performing classification on a corpus of objects, each object to be designated as belonging to a class or not belonging to the class, comprising: accessing a training set comprising a plurality of binary classified objects, each object including one or more features, and each object designated as belonging to the class or not belonging to the class; building a model comprising a probability that each of the one or more features implies that an inspected object belongs to the class; accessing a particular object from the corpus; analyzing the particular object to identify one or more identified features, the identified features selected form the one or more features; assigning the particular object a composite score comprising a sum of the identified features; and designating the particular object as belonging to the class if and only if the composite score is above a threshold.

There is further disclosed an example, wherein building a model further comprises an accuracy to at least some of the one or more features, the accuracy comprising a probability that the feature implies one of that an object belongs to the class or does not belong to the class.

There is further disclosed an example, wherein assigning an accuracy comprises a computation of the form $$p(h|d) = \frac{p(h)*p(d|h)}{p(d)},$$

wherein p(h|d) is the accuracy, p(h) is a hypothesis comprising a probability that an object with the feature will either belong to the class or not belong to the class, p(d) is a number of times the feature appears in the training set, and p(d|h) is the number of objects of the hypothesis in the training set containing the feature.

There is further disclosed an example, wherein the classification engine further comprises a cutoff filter to filter features whose accuracy is below a noise threshold, wherein the noise threshold is a mean of accuracies of the training set minus a standard deviation.

There is further disclosed an example, wherein assigning the object a composite score comprises weighting each feature proportional to its accuracy.

There is further disclosed an example, wherein each of the identified features has a value greater than zero if it implies that an object belongs to the class, or a value less than zero if it implies that an object does not belong to the class.

There is further disclosed an example, wherein computing the composite score comprises a function of the form $$S = \ln\frac{1+pos}{1+neg},$$

wherein S is the composite score, pos is a sum of yea features, and neg is a sum of nay features.

There is further disclosed an example, wherein the classification engine further comprises a synonym detector to identify and group features with similar or identical meaning.

There is further disclosed an example, wherein the features comprise metadata features other than word counts.

There is further disclosed an example, wherein the classification engine is to provide interactive supervised learning.

There is further disclosed in an example, a method of performing classification on a corpus of objects, each object to be designated as belonging to a class or not belonging to the class, comprising: accessing a training set comprising a plurality of binary classified objects, each object including one or more features, and each object designated as belonging to the class or not belonging to the class; building a model comprising a probability that each of the one or more features implies that an inspected object belongs to the class; accessing a particular object from the corpus; analyzing the particular object to identify one or more identified features, the identified features selected form the one or more features; assigning the particular object a composite score comprising a sum of the identified features; and designating the particular object as belonging to the class if and only if the composite score is above a threshold.

There is further disclosed an example, wherein building a model further comprises an accuracy to at least some of the one or more features, the accuracy comprising a probability that the feature implies one of that an object belongs to the class or does not belong to the class.

There is further disclosed an example of one or more tangible, non-transitory computer-readable storage mediums having stored thereon executable instructions for instructing one or more processors for providing a classification engine operable for performing any or all of the operations of any of the preceding examples.

There is further disclosed an example of a method of providing a classification engine comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

The invention claimed is:

1. A computing apparatus for performing binary classification on a corpus of objects, each object to be designated as either belonging to a class or not belonging to the class, the computing apparatus comprising:
   one or more logic elements, including at least one hardware logic element, comprising a classification engine to:
      access a training set comprising a plurality of binary classified objects, each binary classified object in the training set including one or more features, and each binary classified object in the training set designated as belonging to the class or not belonging to the class;
      build a model based on the training set, wherein the model identifies, for the class, a first set of features positively correlated with the class and a second set of features negatively correlated with the class comprising a probability that each of the one or more features implies that an inspected object belongs to the class;
      access a particular object from the corpus;

analyze the particular object to identify one or more identified features of the particular object, the identified features selected from the first set of features and the second set of features;

assign the particular object a composite score comprising a sum of the identified features, wherein instances of the first set of features in the identified features have a positive value in the sum and instances of the second set of features in the identified features have a negative value in the sum; and designate the particular object as belonging to the class if and only if the composite score is above a threshold.

2. The computing apparatus of claim 1, wherein building a model further comprises an accuracy to at least some of the one or more features, the accuracy comprising a probability that the feature implies one of that an object belongs to the class or does not belong to the class.

3. The computing apparatus of claim 2, wherein assigning an accuracy comprises a computation of the form $$p(h|d) = \frac{p(h) * p(d|h)}{p(d)},$$

wherein p(h|d) is the accuracy, p(h) is a hypothesis comprising a probability that an object with the feature either belongs to the class or does not belong to the class, p(d) is a number of times the feature appears in the training set, and p(d|h) is the number of objects of the hypothesis in the training set containing the feature.

4. The computing apparatus of claim 2, wherein the classification engine further comprises a cutoff filter to filter features whose accuracy is below a noise threshold.

5. The computing apparatus of claim 4, wherein filter is a mean of accuracies of the training set minus a standard deviation.

6. The computing apparatus of claim 2, wherein assigning the object a composite score comprises weighting each feature equally.

7. The computing apparatus of claim 2, wherein assigning the object a composite score comprises weighting each feature proportional to its accuracy.

8. The computing apparatus of claim 1, wherein the composite score is normalized to zero.

9. The computing apparatus of claim 1, wherein computing the composite score comprises a function of the form $$S = \ln\frac{1+pos}{1+neg},$$

wherein S is the composite score, pos is a sum of features implying that an object belongs to the class, and neg is a sum of features implying that an object does not belong to the class.

10. The computing apparatus of claim 1, wherein the classification engine further comprises a synonym detector to identify and group features with similar or identical meaning.

11. The computing apparatus of claim 1, wherein the features comprise metadata features other than word counts.

12. The computing apparatus of claim 1, wherein the classification engine is to provide interactive supervised learning.

13. At least one non-transitory computer-readable storage medium having stored thereon executable instructions for performing classification on a corpus of objects, each object to be designated as belonging to a class or not belonging to the class, comprising:

accessing a training set comprising a plurality of binary classified objects, each binary classified object in the training set including one or more features, and each binary classified object in the training set designated as belonging to the class or not belonging to the class;

building a model based on the training set, wherein the model identifies, for the class, a first set of features positively correlated with the class and a second set of features negatively correlated with the class;

accessing a particular object from the corpus;

analyzing the particular object to identify one or more identified features of the particular object, the identified features selected from the first set of features and the second set of features;

assigning the particular object a composite score comprising a sum of the identified features, wherein instances of the first set of features in the identified features have a positive value in the sum and instances of the second set of features in the identified features have a negative value in the sum; and designating the particular object as belonging to the class if and only if the composite score is above a threshold.

14. The storage medium of claim 13, wherein building a model further comprises an accuracy to at least some of the one or more features, the accuracy comprising a probability that the feature implies one of that an object belongs to the class or does not belong to the class.

15. The storage medium of claim 14, wherein assigning an accuracy comprises a computation of the form $$p(h|d) = \frac{p(h) * p(d|h)}{p(d)},$$

wherein p(h|d) is the accuracy, p(h) is a hypothesis comprising a probability that an object with the feature will either belong to the class or not belong to the class, p(d) is a number of times the feature appears in the training set, and p(d|h) is the number of objects of the hypothesis in the training set containing the feature.

16. The storage medium of claim 14, wherein the classification engine further comprises a cutoff filter to filter features whose accuracy is below a noise threshold, wherein the noise threshold is a mean of accuracies of the training set minus a standard deviation.

17. The storage medium of claim 14, wherein assigning the object a composite score comprises weighting each feature proportional to its accuracy.

18. The storage medium of claim 13, wherein computing the composite score comprises a function of the form $$S = \ln\frac{1+pos}{1+neg},$$

wherein S is the composite score, pos is a sum of yea features, and neg is a sum of nay features.

19. The storage medium of claim 13, wherein the classification engine further comprises a synonym detector to identify and group features with similar or identical meaning.

20. The storage medium of claim 13, wherein the features comprise metadata features other than word counts.

21. The storage medium of claim 13, wherein the classification engine is to provide interactive supervised learning.

22. A method of performing classification on a corpus of objects, each object to be designated as belonging to a class or not belonging to the class, comprising:
   accessing a training set comprising a plurality of binary classified objects, each binary classified object in the training set including one or more features, and each binary classified object in the training set designated as belonging to the class or not belonging to the class;
   building a model based on the training set, wherein the model identifies, for the class, a first set of features positively correlated with the class and a second set of features negatively correlated with the class;
   accessing a particular object from the corpus;
   analyzing the particular object to identify one or more identified features of the particular object, the identified features selected from the first set of features and the second set of features;
   assigning the particular object a composite score comprising a sum of the identified features, wherein instances of the first set of features in the identified features have a positive value in the sum and instances of the second set of features in the identified features have a negative value in the sum; and
   designating the particular object as belonging to the class if and only if the composite score is above a threshold.

23. The method of claim 22, wherein building a model further comprises an accuracy to at least some of the one or more features, the accuracy comprising a probability that the feature implies one of that an object belongs to the class or does not belong to the class.

24. The method of claim 22, wherein each of the plurality of binary classified objects and the particular object comprise respective text content, and the identified features correspond to characteristics of the text content.

* * * * *